July 1, 1969  J. W. TURNER  3,452,374
THIGH TYPE-WEATHER DECK SURVIVAL RESTRAINT HARNESS
Filed Sept. 20, 1967  Sheet 1 of 2

INVENTOR.
JAMES W. TURNER
BY Thomas Glenn Keough

ATTORNEYS

July 1, 1969  J. W. TURNER  3,452,374
THIGH TYPE-WEATHER DECK SURVIVAL RESTRAINT HARNESS
Filed Sept. 20, 1967

INVENTOR.
JAMES W. TURNER
BY *Thomas Glenn Keough*
*[signature]*
ATTORNEYS

United States Patent Office 3,452,374
Patented July 1, 1969

3,452,374
THIGH TYPE-WEATHER DECK SURVIVAL
RESTRAINT HARNESS
James W. Turner, 1572 Pepper Drive,
El Centro, Calif. 92243
Filed Sept. 20, 1967, Ser. No. 669,316
Int. Cl. B63c 9/16, 9/20; A62b 35/00
U.S. Cl. 9—313                                    10 Claims

ABSTRACT OF THE DISCLOSURE

The present invention is directed to providing a universal restraint harness having the capability to buoy its wearer that includes a pair of thigh encircling members adjustably formed to grip the two thighs of the wearer for enabling vertical support from the thighs instead of the crotch area. A shoulder web and a pair of torso webs joined by slip links and snapped in front permit freedom of motion yet securely hold the wearer in the harness when buoyed by a pair of inflatable floats or when raised to a rescue helicopter.

STATEMENT OF GOVERNMENT INTEREST

The invention described herein may be manufactured and used by or for the Government of the United States of America for governmental purposes without the payment of any royalties thereon or therefor.

Background of the invention

Personnel working over a body of water or seamen performing routine chores aboard ship are ever present to the danger of being swept overboard and drowned since tools carried and clothing worn add sinking weight that prevents a victim's resurfacing. Deck captains and deck crews responsible for the positioning of aircraft on an aircraft carrier prior to launching and after landing perform a variety of duties requiring great agility. Conventional life jackets are objectionable since they are too bulky, tend to restrict freedom of motion, or are uncomfortable when worn for extended periods of time. For such reasons harnesses and life jackets having straps passing through the crotch area are not worn, irrespective of the attendant danger. Additionally, none of the existing flotation harnesses have hookup loops for securing a crewman in the cockpit of an aircraft being positioned on the flight deck.

Summary of the invention

The present invention is directed to providing a universal restraint harness having the capability to buoy its wearer that includes a pair of thigh encircling members adjustably formed to grip the two thighs of the wearer for enabling vertical support from the thighs instead of the crotch area. A shoulder web and a pair of torso webs joined by slip links and snapped in front permit freedom of motion yet securely hold the wearer in the harness when buoyed by a pair of inflatable floats or when raised to a rescue helicopter. A pair of hookup links and riser couplers are included to provide a secure intercockpit connection.

It is a primary object of the instant invention to provide a harness having selectively inflatable float means attached thereto.

Another object of the invention is to provide a harness having a limited bulk arranged to insure maximum utilization of the physical capabilities of the wearer.

It is a further object of the invention to provide a flotation means void of cumbersome straps and fittings and having several couplers and links to enable the wearer to be secured within an aircraft cockpit.

Still another object of the invention is to provide a harness which is universally adaptable to different sizes of wearers and can be comfortably worn during standby periods.

Other objects and advantages of the invention will appear more clearly from the ensuing specification in connection with the accompanying drawings in which.

Preferred embodiment of the invention

Figure 1:
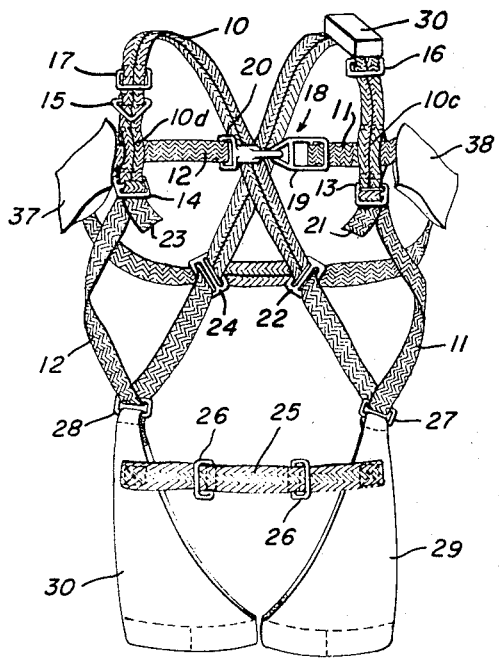
FIG. 1 illustrates a perspective front view of the harness.
Figure 1A:
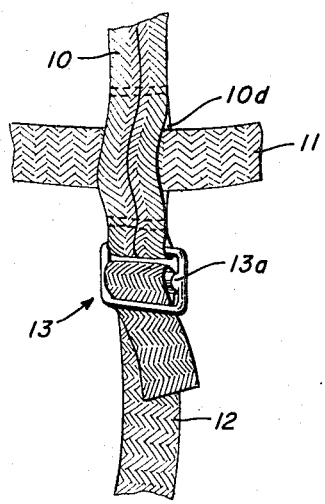
FIG. 1a is a perspective view of a slide buckle interconnection.
Figure 2:
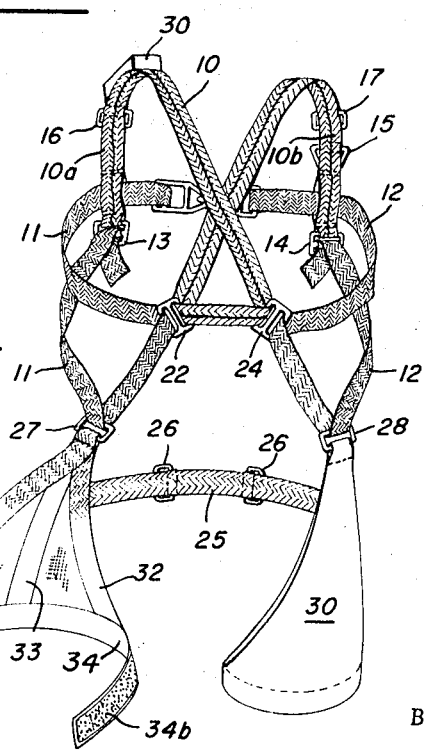
FIG. 2 shows a perspective back view of the harness.
Figure 1B:
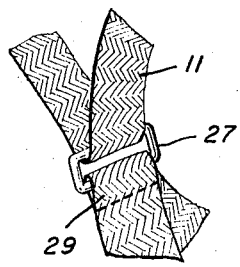
FIG. 1b is a perspection of a webbing link detail.

Referring now to the drawings, the harness portion of the invention includes a continuous shoulder web 10 and a left and a right torso web 11 and 12. The webs are constructed of a suitable flexible material but it has been found that nylon is superior since nylon webbing is lightweight, strong, and resists the effects of weather and corrosion. Opposite ends of the shoulder web terminate in friction slide buckles 13 or 14. The buckles are formed of a rectangular open frame and a rounded cross-piece 13a, which together define a first and a second opening on opposite sides of the crosspiece. Shoulder webbing end portions 10a or 10b are looped through the first opening, around one side of the open frame, doubled back, and stitched onto the main portion of the shoulder web. The shoulder web is additionally provided with a triangularly shaped pickup ring 15 and a pair of semicircularly shaped riser couplers 16 and 17. The end portions 10a and 10b contiguously extend along the shoulder web to cover one side of the ring and the couplers. Additional stitching, joining the end portions to the main portion of the shoulder web, secures the ring and couplers and prevents any longitudinal motion by the ring and couplers on the web.

The left torso web 11 includes a length of webbing terminating at one end in a female half 19 of a mating snap 18 and at a left free end 21. The snap here used is a well known quick-release type commonly provided on parachute harnesses, it being understood that the quick-release feature is not essential in the instant harness. The left torso web is slidably connected to buckle 13 by looping the free end through the first opening, around the crosspiece, and through the second opening to contiguously extend on the left web. The combined looping and doubling of the free end on itself through the buckle frictionally secures the two webs together at this point. A hollow rectangularly shaped left slip link 22 having a cross member forming a pair of openings slidably connects the left torso web to the shoulder web at a position corresponding to the back of the wearer by having one web passing through one opening and the other web through the other.

Similarly, the right torso web 12 is doubled back on itself to terminate in its first end at male half 20 of the mating snap 18 and in a right free end 23 connected to frictional slide buckle 14 in a manner identical to that set out above. Right slip link 24 joins the shoulder at right torso webs at the back of the wearer at approximately the same relative height in the same way as the shoulder-left torso web slidable connection. By being so joined the shoulder web crosses itself to prevent the wearer from slipping out of the harness when supported by the shoulder web as will be pointed out below. In addition, the slip link interconnection permits free twisting, reaching, and bending without noticeable restriction by the harness.

The ends of the torso webs carrying the male and female halves of the mating snap pass under the arms and across the chest of the wearer to interconnect at the center of the wearer's chest. While these snap carrying ends can either pass under or over the shoulder web it has been found that it is preferred to insert these ends through channels 10c or 10d formed between end portions 10a or 10b and the main portion of the shoulder web.

The harness portion thusly described additionally carries a webbing link 27 or 28 on either the left or the right torso web. The webbing links slidably connect the torso webs to a pair of thigh circling members 29 and 30 that are joined by a lap belt strap 25 carrying a pair of hookup loops 26. As in the aforementioned slip link interconnection, the webbing links permit free passage of the torso webs to allow unrestricted motion by the wearer. The hookup loops are sewn into the lap belt which may be single strap or two straps snapped together.

Since the thigh encircling members 29 and 30 are substantially identical the ensuring description will deal only with member 29 for the sake of simplicity of disclosure.

Each member includes a substantially triangular shaped cloth portion 31 constructed of a heavy duty canvas or nylon like material that is sewn onto a V-shaped webbing element 32, a center webbing element 33, and a base webbing element 34. The V-shaped and center webbing elements loop through the webbing link 27 to join the encircling member to the rest of the harness. The base element is sewn onto extensions of the V and center webbing elements to form a peripheral triangular frame enclosing an area identical to that of the cloth portion. The base element is additionally provided with a pair of extensions 34a and 34b on which are respectively secured by sewing or gluing on opposite sides, a male fabric and a female fabric of a well known nylon tape fastener sold under the trademark Velcro. It was found that having the nylon tape fastener 1¾ inches wide and approximately 6 inches long was more than adequate to support a weight over 250 pounds.

The pair of inflatable life preservers 37 and 38 are carried one each on the left torso web or the right torso web by loops or snaps mounted on the preservers. The life preservers are either filled from a small container of compressed air carried within the preservers or may be inflated by the wearer's breath. The harness could be provided with an inflatable float currently developed which automatically inflates when subjected to a substantial shock, e.g., upon hitting the water after a fall.

Since slide buckles 13 and 14 and female half 19 of snap 18 frictionally hold interlooped webbing at selective positions, the upper portion of the harness can be adjusted to fit any size trunk while the thigh encircling members can be opened and snugly wrapped around the thighs. Thusly worn with the deflated floats positioned below the arms, the harness presents a minimum obstruction.

Figure 3:
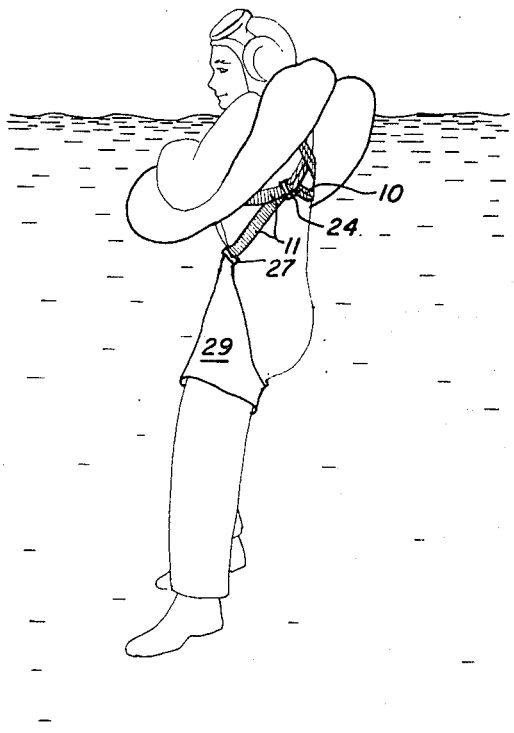
FIG. 3 is a perspective view of a wearer being supported by the inflatable life preservers.
Figure 4:
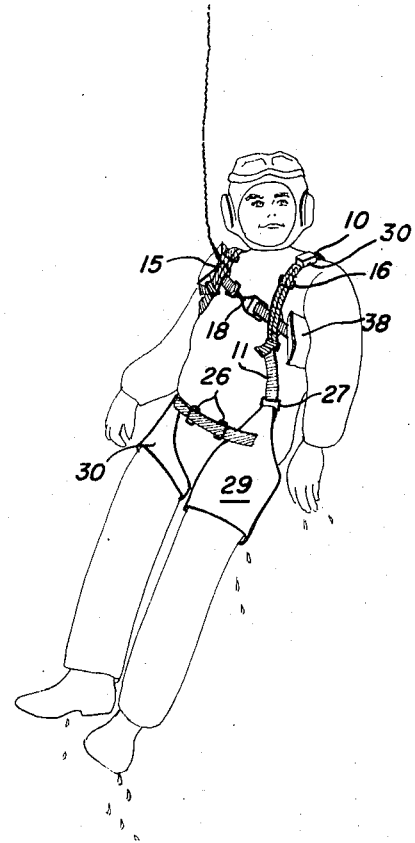
FIG. 4 is a perspective view of the wearer being taken up into a rescuing helicopter.

FIG. 3 shows the floats inflated and supporting a man from beneath the arms. The water wings are preferred because a buoying force is exerted by both the floats beneath the arms and the thigh encircling members via the torso webs. Upon being hoisted from the water by a rescue helicopter attached to the ring (see FIG. 4 showing the floats removed), the wearer's weight is borne by the thigh encircling members and having the shoulder web crossed in back prevents the wearer from falling out of the harness. Here it should be noted that the absence of crotch straps tend to prevent injury during the hoisting operation.

As mentioned above, the harness is provided with a pair of riser couplers and a pair of hookup loops to allow the crewmen to buckle themselves in a cockpit as a safety measure when moving aircraft.

Additional loops may be mounted on the shoulder web to carry distress signals means 30, e.g., a light and whistle, and on the thigh encircling members to hold tools.

It is to be understood that, while there has been described herein in detail and illustrated in the accompanying drawing a presently preferred embodiment of this invention, various modifications, omissions, and refinements which depart from the illustrated embodiment may be adopted without departing from the spirit and scope of this invention.

What is claimed is:

1. An adjustable restraint harness adapted to buoy its wearer comprising:
   a left and a right thigh encircling member, each provided with a free-running webbing link and an adjustable means to permit gripping of a separate one of the wearer's thighs away from the immediate crotch area;
   a shoulder web having a slide buckle at opposite ends;
   a pair of torso webs each having one half of a mating snap disposed at one end and each having a free end, each said free end connected to a separate slide buckle, each torso web passing through a separate free-running webbing link for providing a slidable engagement with both encircling members, and both halves of said mating snap being joined across the wearer's chest;
   an inflatable life preserver carried on each torso web beneath the wearer's arms; and
   a pair of slip links disposed on said shoulder web each slidably connecting one torso web therewith, upon adjustably securing both said adjustable means around the wearer's thighs and being suspendably supported by the interconnected shoulder web and torso webs, the weight of the wearer is carried by said encircling members.

2. A harness according to claim 1 in which each said adjustable means includes a male section and a female section of interlocking material oppositely extending and disposed to interlock when encircled about the wearer's thigh.

3. A harness according to claim 2 in which said encircling members are essentially triangularly shaped with each said adjustable means coextensively mounted along the base of the triangularly shaped member to equally distribute said weight of the wearer along said base.

4. A harness according to claim 3 further including:
   a lap belt interconnecting said encircling members and extending across the abdomen of the wearer and having a pair of lap belt hookup links mounted thereon to provide inertial safety when connected to a transporting vehicle.

5. A harness according to claim 4 further including:
   a pickup ring and a pair of riser couplers, mounted on said shoulder web to permit connection to a rescue helicopter and to provide additional said inertial safety.

6. A harness according to claim 1 in which said torso webs are disposed to position portions of said shoulder web extending from said slip links in a crossing relationship across the back of the wearer and to interconnect each said free end to a separate said slide buckle at opposite sides of the wearer's chest.

7. A harness according to claim 6 further including:
   a distress signal means carried on said shoulder web.

8. A harness according to claim 5 in which said torso webs are disposed to position portions of said shoulder web extending from said slip links in a crossing relationship across the back of the wearer and to interconnect each said free end to a separate said slide buckle at opposite sides of the wearer's chest and further including:
   a distress signal means carried on said shoulder web.

9. A harness according to claim 8 in which each said life preserver is selectively inflatable by a compressed air cartridge and by mouth.

10. A harness according to claim 9 in which each said life preserver is automatically inflated upon hitting the water.

References Cited

UNITED STATES PATENTS

| | | | |
|---|---|---|---|
| 2,123,446 | 7/1938 | Veenstra | 9—322 X |
| 2,533,446 | 12/1950 | Fisher | 9—316 |
| 2,721,257 | 10/1955 | Knox | 9—313 X |
| 2,887,286 | 5/1959 | Moran | 244—151 X |
| 3,023,433 | 3/1962 | Davyso | 9—336 |
| 3,205,544 | 9/1965 | Streule et al. | 24—201 X |
| 3,322,102 | 5/1967 | Windle | 244—151 X |

MILTON BUCHLER, *Primary Examiner.*

THOMAS W. BUCKMAN, *Assistant Examiner.*

U.S. Cl. X.R.

9—314; 244—151